United States Patent [19]

Hennart et al.

[11] 3,852,439

[45] Dec. 3, 1974

[54] COMPOSITIONS WITH A BASE OF PHOSPHORIC ESTERS COMBINED WITH A STABILISER

[75] Inventors: Claude Hennart, Aubervilliers; Marcel Louis Dulat, Poitiers, both of France

[73] Assignee: Ciba-Geigy AG, Basle, Switzerland

[22] Filed: Sept. 14, 1971

[21] Appl. No.: 180,507

[30] Foreign Application Priority Data

Sept. 11, 1970 France .............................. 70.33013

[52] U.S. Cl. ................................................ 424/219
[51] Int. Cl. ............................................... A01n 9/36
[58] Field of Search .................................... 424/219

[56] References Cited
UNITED STATES PATENTS

| | | | |
|---|---|---|---|
| 2,493,927 | 1/1950 | Prill | 424/278 |
| 2,826,530 | 3/1958 | Eddy et al. | 424/278 |
| 2,891,889 | 6/1959 | Haynes | 424/278 |
| 2,904,463 | 9/1959 | Moorefield | 424/278 |
| 3,053,729 | 9/1962 | Sun | 424/278 |
| 3,093,536 | 6/1963 | Loeffler | 424/219 |
| 3,097,128 | 7/1963 | Sprinkle et al. | 424/219 |
| 3,116,201 | 12/1963 | Whetstone | 424/219 |

OTHER PUBLICATIONS

Hoffman et al. J. Econ. Entomol. 47:72–76 (1954).
Cole et al. J. Econ. Entomol. 49:747–750 (1956).
Sun et al. J. Agr. Food Chem. 8:261–266 (1960).
Zschintzsch Arzneimittel-Forsch 11:579–586, 672–675 (1961), per GA.55:25138b(1961).

Primary Examiner—Shep K. Rose
Attorney, Agent, or Firm—Wenderoth, Line & Ponack

[57] ABSTRACT

Pesticidal compositions containing at least one phosphoric ester insecticide of which the molecule has at least one alkyl group of one to three carbon atoms, an agent for stabilising the said ester against decomposition by protonisation and used in an amount of 0.2 to 10% based on the weight of phosphoric ester, characterised in that the stabilising agent contains at least one compound selected from the compounds of the chemical class of 1,3-benzodioxoles and optionally in addition to it a further compound selected from elemental sulphur, from a divalent sulphur compound and from a diazene.

Process for stabilising a phosphoric ester pesticide, the molecule of which has at least one alkyl group containing one to three carbon atoms, characterised in that there is added to the phosphoric ester or to the mixture containing it 0.2 to 10%, calculated on the weight of phosphoric ester, of an agent capable of stabilising the phosphoric ester against protonisation and being constituted by at least one compound chosen from the chemical class of benzodioxoles.

6 Claims, No Drawings

COMPOSITIONS WITH A BASE OF PHOSPHORIC ESTERS COMBINED WITH A STABILISER

This invention relates to a process for stabilising pesticidal phosphoric esters, and new stabilised compositions containing such esters.

Phosphoric esters are now widely used as pesticides, particularly as insecticides. Their wide use is due principally to their rapid action and the absence of any accumulation of the compounds in living tissue as a result of their rapid hydrolysis in situ.

This last characteristic, which gives a net advantage over "chlorinated" pesticides, is on the other hand, a serious disadvantage: the sensitivity of certain phosphoric acid esters to humidity, even just that of the atmosphere, is such that decomposition takes place before they are able to act on the pest organisms. The esters particularly susceptible to this are those containing low alkyl groups such as methyl, ethyl, propyl or isopropyl attached to the phosphoric anion. On contact with molecules of water, at least partial decomposition of the esters takes place by protonisation, i.e. by replacement of a low alkyl group by hydrogen.

Among the sensitive phosphoric esters, special mention should be made of 0-2,2-dichlorovinyl-0,0-dimethyl phosphate, better known by the common name of DICHLORVOS or DDVP, the use of which in permanent insecticidal devices, so-called evaporaters, has risen very greatly during recent years.

Various methods of stabilisation have already been suggested to limit the decomposition of there phosphoric esters, but they are generally toxic such as phenols, amines or low nitrogen heterocyclics; another class of useful stabilisers includes azoic and hydrazonic compounds, but these possess a strong colouring ability which does not always permit them to be used. The use of anhydrides or epoxides has also been suggested, but it is known that these compounds act by fixation either of a molecule of water or of a molecule of free acid: it is clear that this process is stoichiometrically limited and that stabilisation ceases when all stabiliser has reacted. This leads to the necessity of using substantial proportions of these stabilisers, which is not economic.

It is an object of the present invention to stabilise pesticidal phosphoric esters by using substances more efficacious and not having the disadvantages stated above.

Certain benzodioxole derivatives have been suggested as insecticidal synergists, i.e. as reinforcing agents for the insecticidal action on contact with the insects, these being at very high concentrations of the order of 200 to 500% taken on the basis of the total weight of insecticidal compound. It has never been found, before the present invention, that the benzodioxole derivatives, particularly at low concentrations, are useful for preserving phosphoric esters against protonisation.

The invention accordingly includes pesticidal compositions comprising:

A. at least one pesticidal phosphoric ester, the molecule of which includes at least one alkyl group of 1 to 3 carbon atoms B. an agent stabilising the ester against decomposition by protonisation and used in a proportion of 0.2 to 10% by weight, preferably 0.5 to 6%, based on the weight of phosphoric ester, and wherein the stabiliser in the said composition is chosen from 1,3-benzodioxoles. Such a composition may optionally contain a solvent for the phosphoric ester, which may be solid or liquid, under pressure or otherwise. It may also optionally contain one or more inert mineral or organic adjuvants.

The present invention also includes a process for stabilising a pesticidal phosphoric ester of which the molecule contains at least one alkyl group of one to three carbon atoms, optionally in admixture with a solvent for the phosphoric ester, which solvent is solid or liquid at ambient temperature under pressure or not, and/or optionally in admixture with one or more adjuvants compatible with the phosphoric ester, which process comprising adding to the phosphoric ester or to a mixture containing it, 0.2 to 10% calculated on the weight of phosphoric ester, of an agent capable of stabilising the phosphoric ester against protonisation, and constituted by at least one 1,3-benzodioxole.

According to a preferred embodiment, the present invention also includes compositions comprising ingredients (A) and (B) above, and furthermore including: (C) at least one second agent stabilising the said pesticidal phosphoric ester against protonisation, this second agent being selected from elemental sulphur, divalent sulphur compounds such as those defined in patent application No. 180,137 filed on Sept. 13, 1971, now U.S. Pat. No. 3,836,643, and diazenes.

This second stabilising agent, used in a proportion of between 0.1 and about 5 %, based on the weight of phosphoric ester pesticide, augments the stabilising effect of the principal agent in a fashion showing a pronounced synergistic stabilisation action.

According to a preferred embodiment, the total proportion of stabilising agent is between 0.5 and 6% based on the weight of phosphoric ester. In the proportions suggested in the present invention, the benzodioxole has no action as toxicity synergist for the insecticidal phosphoric ester.

The preferred benzodioxoles for use in the present invention are defined by general formula I

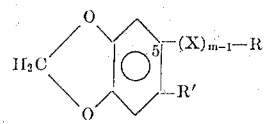

I wherein $m$ is 1 or 2, and X is an alkylene bridge of one to seven 15 carbon atoms, an alkenylen bridge of two to seven carbon atoms or an alkadienylene bridge of four to seven carbon atoms, and R' is one of the following
  a. hydrogen
  b. alkyl of one to six carbon atoms unsubstituted or substituted by phenyl or nitro.
  c. alkenyl of 2 to 6 carbon atoms, unsubstituted or substituted by phenyl or nitro,
  d. nitro
  e. halogen of atomic number not greater than 35
  f. low alkoxy, and
A. $m$ representing only 1
R represents one of the following in formula I
  a. hydrogen
  b. low alkyl
  c. low alkenyl
  d. halogen of atomic number not exceeding 17
  e. nitro,
  f. the group

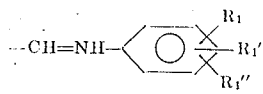

in which each of $R_1$, $R_1'$ and $R_1''$, independently of the others, is the same or a different group selected from the following: hydrogen, low alkyl, low alkoxy, hydroxy, nitro, chloro, bromo and low alkylthio:

g. the group

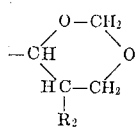

in which $R_2$ is hydrogen or low alkyl, h. the group

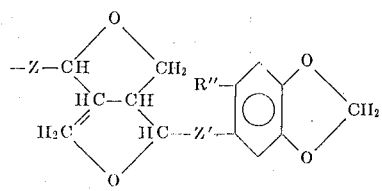

in which Z and Z' are each independently a C—C bond or an oxygen atom (—O—), and R'' is hydrogen, low alkyl or low alkoxy.

i. the group

in which $R_3$ is alkyl of one to six carbon atoms or oxaalkyl of at most 15 carbons atoms and having one or two atoms of oxygen in the chain B. $m$ representing 1 or 2

R represents one of the following constituents in formula I i. cyano ii. the group

wherein
$R_4$ is hydrogen, low alkyl or low alkanoyl, and
$R_5$ is hydrogen or low alkyl,
or $R_4$ and $R_5$ together with the nitrogen atom to which they are attached, constitute a pyrrolidino, piperidino. morpholino or azepino group, unsubstituted or substituted by low alkyl, iii. the group —CO—$R_6$ in which $R_6$ is one of the following constituents:
a. hydrogen
b. —OM in which M is hydrogen or an equivalent metal ion
c. low alkyl
d. low alkoxy
e. alkoxyalkoxy of two to seven carbon atoms
f. alkoxyalkoxyalkoxy of 4 to 10 carbon atoms
g. phenyl, unsubstituted or substituted by one or more of the following substituents: low alkyl, low alkoxy, chloro, bromo;
h. the group

wherein each or $R_7$ and $R_7'$ is independently selected from hydrogen, low alkyl or phenyl iv. the group

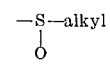

in which the alkyl group has one to eight carbon atoms v. the group —O—$R_8$
in which $R_8$ is low alkyl or oxa alkyl of at most 15 carbon atoms and three oxygen atoms in the chain.

vi. the group

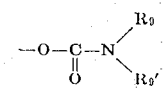

in which each of $R_9$ and $R_9'$ independently is hydrogen or low alkyl, or $R_9$ and $R_9'$ take together with the nitrogen atom to which they are bond, constitute a pyrrolidino, piperidino, morpholino or azepino group, or C. $m$ representing 1
R and R' taken together represent one of the following divalent groups:

α. the group

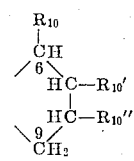

in which each of $R_{10}$, $R_{10}'$ and $R_{10}''$ independently is hydrogen, low alkyl, alkoxycarbonyl of two to five carbon atoms, or the group —COOM, M having the meaning given above, or β. the group

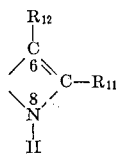

in which $R_{11}$ is one of the following constituents, hydrogen, low alkyl, low alkoxy, low alkanoyl or benzoyl, and $R_{12}$ represents one of the following constituents:

hydrogen, low alkyl, low alkoxy or the group

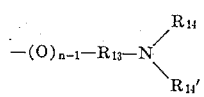

wherein $n$ is 1 or 2

$R_{13}$ is an alkylene bridge of two to four carbon atoms, and each of $R_{14}$ and $R_{14}'$ independently, is hydrogen or low alkyl, or $R_{14}$ and $R_{14}'$ taken together with the nitrogen atom to which they are bound, are a pyrrolidino, piperidino, morpholino or azepino group.

The organic constituents noted above for formula I and qualified above and in what follows, and in the claims, by the term "low" have at most six carbon atoms and preferably one to four carbon atoms.

Included also within the benzodioxoles of formula I are the more or less volatile addition salts formed between benzodioxoles having a basic function and suitable organic or mineral acids. The term metallic ion, used in defining M above, includes ammonium ions $NR_wR_xR_yR_z$ in which $R_w$, $R_x$, $R_y$ and $R_z$ each independently represent hydrogen or an organic group, chiefly low alkyl.

The term benzodioxole used in the following examples and claims always means 1,3-benzodioxole.

Particularly preferred benzodioxoles among those defined by formula I above, are chosen from the following classes:

1. Simple benzodioxoles defined by formula I'

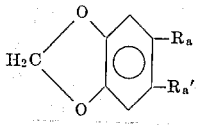

wherein $R_a$ is chosen from:

hydrogen, fluorine, bromine, alkyl of one to six carbon atoms, unsubstituted or substituted by nitro or phenyl, alkenyl of two to four carbon atoms, nitroalkenyl of two to four carbon atoms, styryl and nitro, and $R_a'$ is chosen from:

hydrogen, fluorine, chlorine, bromine and alkyl of one to six carbon atoms.

Such compounds are, for example, the following:
a. 5-nitro benzodioxole
b. 5-fluoro benzodioxole
c. 5-chloro benzodioxole
d. 5-bromo benzodioxole
e. 5,6-dichloro benzodioxole
f. 5,6-dibromo benzodioxole
g. 5-methyl benzodioxole
h. 5-propyl benzodioxole
i. 5-isobutyl benzodioxole
j. 5-tertbutyl benzodioxole
k. 5-hexyl benzodioxole
l. 5-methyl 6-propyl benzodioxole
m. 5,6-dimethyl benzodioxole
n. 5-(2-nitro propyl) benzodioxole o. 5-vinyl benzodioxole
p. 5-allyl benzodioxole
r. 5-(propen-1-yl) benzodioxole
s. 5-methallyl benzodioxole
t. 5-allyl 6-methyl benzodioxole
u. 5-allyl 6-butyl benzodioxole
v. 5-styryl benzodioxole
w. 5-(2-nitro vinyl) benzodioxole
x. 5-(2-nitro propen-1-yl) benzodioxole
y. 5-benzyl benzodioxole;

2. Carbonylated benzodioxoles defined by formula II

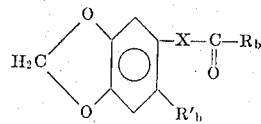

lene group, each of which contains at most seven carbon atoms in straight or branched chain; $R_6{}^b$ is hydrogen or alkyl of one to four carbon atoms or phenyl optionally substituted by one or two low alkyl groups, or a carbamoyl group optionally substituted by one or two low alkyl groups or phenyl, and $R_6{}^b$ represents hydrogen, low alkyl, chlorine, bromine, fluorine or nitro. Such compounds are, for example, the following:
a. 5-formyl benzodioxole
b. 5-chloro 6-formyl benzodioxole
c. 5-formyl 6-nitro benzodioxole
d. 5-(2-formyl vinyl) benzodioxole
e. 5-acetyl benzodioxole
f. 5-acetyl 6-methyl benzodioxole
g. 5-propionyl benzodioxole
h. 5-benzoyl benzodioxole
i. 5-butyryl benzodioxole
j. 5-(2-carbamoyl ethyl) benzodioxole
k. 5-(2-N-methylcarbamoyl ethyl) benzodioxole
l. 5-(3-N-methylcarbamoyl propyl) benzodioxole
m. 5-(1-N-methylcarbamoyl 2-propyl) benzodioxole
n. 5-(2-N-butylcarbamoyl ethyl) benzodioxole
o. 5-(2-N,N-dimethylcarbamoyl ethyl) benzodioxole
p. 5-(2-N-phenylcarbamoyl ethyl) benzodioxole
q. 5-(2-N,N-diphenylcarbamoyl ethyl) benzodioxole
r. 5-(2-oxo propyl) benzodioxole
s. 5-(3-oxo butyl) benzodioxole
t. 5-(2-oxo butyl) benzodioxole
u. 5-(2-oxo pentyl) benzodioxole
v. 5-[2-(4-methyl benzoyl) vinyl] benzodioxole
w. 5-(2-oxo hexyl) benzodioxole
x. 5-benzoylmethyl benzodioxole
y. 5-(3-oxo butene-1 yl) benzodioxole
z. 5-(4-methyl benzoyl)methyl benzodioxole
a'. 5-(3-oxo-2-methyl butene-1 yl) benzodioxole
b'. 5-(2,4-dimethyl benzoyl)methyl benzoxioxole
c'. 5-(3-oxo 2-methyl pentene-1 yl) benzodioxole
d'. 5-(4-ethyl benzoyl)methyl benzodioxole
e'. 5-(3-oxo 2-pentyl butene-1 yl) benzodioxole
f'. 5-(3-oxo 2-ethyl butene-1 yl) benzodioxole
g'. 5-(2-benzoyl ethyl) benzodioxole
h'. 5-(3-benzoyl propyl) benzodioxole
i'. 5-(3-oxo 2-isopropyl butene-1 yl) benzodioxole
j'. 5-(2-benzoyl vinyl) benzodioxole
k'. 5-(3-acetyl 2,2-diethyl propyl) benzodioxole
l'. 5-(2-formyl ethyl) benzodioxole
m'. 5-[2-(2,4 dichloro benzoyl) ethyl] benzodioxole n'. 5 [2-(4-bromo benzoyl) ethyl] benzodioxole
n'. 5-(7-acetyl heptyl) benzodioxole 3. Carboxylated benzodioxoles defined by formula III

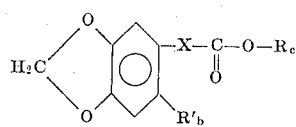

in which X and $R_b'$ are as defined in (2) above, and $R_c$ is hydrogen, alkyl of one to four carbon atoms or low alkenyl, or an oxa-alkyl group containing three to seven carbon atoms or a dioxa-alkyl group containing five to ten carbon atoms, or a phenyl group. Such compounds are, for example, the following:

a. 5-carboxy benzodioxole
b. 5-methyoxycarbonyl benzodioxole
c. 5-ethoxycarbonyl benzodioxole
d. 5-butoxy carbonyl benzodioxole
e. 5-(2-ethoxy ethoxy) carbonyl benzodioxole
f. 5-(3,6-dioxa decyl) oxycarbonyl benzodioxole
g. 5-(2-carboxy vinyl) benzodioxole
h. 5-(2-carboxy ethyl) benzodioxole
i. 5-(2-carboxy hepten-1 yl) benzodioxole
k. 5-(2-methoxycarbonyl vinyl) benzodioxole
l. 5-(2-butoxy carbonyl vinyl) benzodioxole
m. 5-(2-carboxy vinyl) 6-nitro benzodioxole
n. 5-carboxy 6-nitro benzodioxole
o. 5-ethoxycarbonyl 6-nitro benzodioxole
p. 5-(carboxymethyl) benzodioxole
q. 5-(4-carboxy butadien-1,3 yl) benzodioxole
r. 5-carboxy 6-chloro benzodioxole
s. 5-ethoxycarbonyl 6-methyl benzodioxole
t. 5-phenoxycarbonyl benzodioxole
u. 5-(phenoxycarbonyl-methyl) benzodioxole
v. 5-allyloxycarbonyl benzodioxole.

4. Nitrilated benzodioxoles defined by formula IV

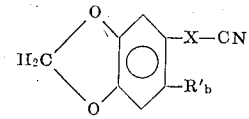

in which X and $R_b'$ are as defined in (2) above. Such compounds are, for example a. 5-cyano benzodioxole
b. 5-cyano 6-nitro benzodioxole
c. 5-cyanomethyl benzodioxole
d. 5-(2-cyano ethyl) benzodioxole
e. 5-(2-cyano vinyl) benzodioxole
f. 5-(2-cyano vinyl) 6-nitro benzodioxole
g. 5-(2-cyano hepten-1 yl) benzodioxole
h. 5-(5-cyano pentyl) benzodioxole
i. 5-(2-cyano heptyl) benzodioxole
j. 5-cyano 6-chloro benzodioxole
k. 5-cyanomethyl 6-methyl benzodioxole.

5. Hydroxylated benzodioxoles of formula V.

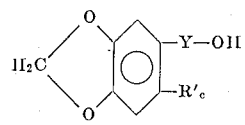

in which Y is a direct band or is alkylene of one to four carbon atom in straight or branched chain, or is low alkenylene, and $R_c'$ is hydrogen, methyl, bramine or chlorine. Such compounds are, for example:

a. 5-hydroxy benzodioxole
b. 5-hydroxymethyl benzodioxole,
c. 5-(hydroxy-2 ethyl) benzodioxole
d. 5-(hydroxy ethyl) benzodioxole
e. 5-(3-hydroxy propyl) benzodioxole
f. 5-(1-hydroxy propyl) benzodioxole
g. 5-(1-hydroxy butyl) benzodioxole
h. 6-chloro 5-hydroxymethyl benzodioxole
i. 5-hydroxy 6-methyl benzodioxole
j. 5-hydroxymethyl 6-methyl benzodioxole;
k. 5-hydroxy 6-bromo benzodioxole
l. 5-(3-hydroxy butene-1 yl) benzodioxole.

6. Aminated benzodioxoles defined by formula VI.

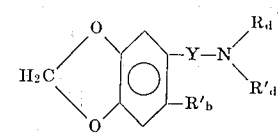

wherein $R_b'$ and Y are as defined in (2) and (5) above respectively, and $R_d$ and $R_d'$ are the same or different and are each hydrogen or alkyl of one to four carbon atoms, or one of them can be alkanoyl of one to four carbon atoms, and also $R_d$ and $R_d'$ can represent, together with the nitrogen atom to which they are attached, pyrrolidino, piperidino, morpholino or azepino. Such compounds are, for example, the following:

a. 5-(N,N-dimethylamino) benzodioxole
b. 5-(N,N-dimethylaminomethyl) benzodioxole
c. 5-(2-amino propyl) benzodioxole
d. 5-(N-formyl N-methyl aminomethyl) benzodioxole
e. 5-(N-acetylaminomethyl) benzodioxole
f. 5-(2-N-butyrylamino propyl) benzodioxole
g. 5-(2-N-methylamino ethyl) benzodioxole
h. 5-(2-N,N-diethylamino butyl) benzodioxole
i. 5-(2-N,N-dibutylamino ethyl) benzodioxole
j. 5-piperidinomethyl benzodioxole
k. 5-(1-azepinyl methyl) benzodioxole
l. 5-(2-morpholino ethyl) benzodioxole
m. 5-(4-methyl piperidino) methyl benzolioxole
n. 5-(2-pyrrolidino ethyl) benzodioxole
o. 5-aminomethyl 6-nitro benzodioxole
p. 5-(2-amino propyl) 6-nitro benzodioxole
q. 5-(N,N-dimethylaminomethyl) 6-nitro benzodioxole
r. 5-piperidino benzodioxole
s. 5-(3-N,N-dimethylamino butene-1 yl) benzodioxole
t. 5-(2-N-methylamino ethyl) 6-isopropyl benzodioxole
u. 5-(2-amino propyl) 6-methyl benzodioxole
v. 5-(2-amino propyl) 6-chloro benzodioxole.

7. Benzoxazoles having a sulphoxide function defined by formula VII.

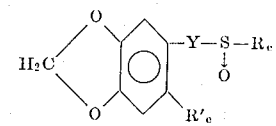

wherein Y is as defined in (5) above, but is preferably an alkylene bridge, $R_e$ is alkyl of one to eight carbon atoms and $R_e'$ is hydrogen or alkyl of one to four carbon atoms. Such compounds are, for example, the following:
a. 5-(2-methylsulfinyl butyl) benzodioxole
b. 5-(2-butylsulfinyl ethyl) benzodioxole
c. 5-(2butylsulfinyl propyl) benzodioxole
d. 5-(2-octyl sulfinyl propyl) benzodioxole
e. 5-(2-octylsulfinyl ethyl) benzodioxole
f. 5-(3-octylsulfinyl propyl) benzodioxole
g. 6-methyl 5-(2-octylsulfinyl propyl) benzodioxole
h. 6-propyl 5-(2-octylsulfinyl propyl) benzodioxole
i. 6-butyl 5-(2-octylsulfinyl propyl) benzodioxole
j. 5-(2-octylsulfinyl ethyl 6-chloro) benzodioxole;

8. Benzodioxoles having at least one ether group defined by formula VIII

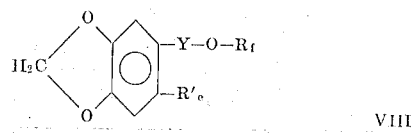

VIII in which Y and $R_e'$ are as defined in (5) and (7) above respectively, and $R_f$ is alkyl of one to four carbon atoms or alkoxyalkyl of two to seven carbon atoms, or alkoxyalkoxy-alkyl of 4 to 10 carbon atoms, or alkoxyalkoxy alkoxy alkyl of 5 to 15 carbon atoms, or phenyl. Such compositions are, for example, the following:
a. 5-methoxy benzodioxole
b. 5-butoxy benzodioxole
c. 5-(2-ethoxy ethoxy) benzodioxole
d. 5-(2-ethoxy methyl) benzodioxole
e. 5-(2-methoxy propyl) benzodioxole
f. 5-(2-butoxy butyl) benzodioxole
g. 5-(2,5,8-trioxa dodecyl) benzodioxole
h. 5-methyl 6-(2,5,8-trioxa dodecyl) benzodioxole
i. 5-propyl 6-(2,5,8-trioxa dodecyl) benzodioxole
j. 5-butyl 6-(2,5,8-trioxa dodecyl) benzodioxole
k. 6-chloro 5-ethoxymethyl benzodioxole
l. 5-(3-methoxy butene-1 yl) benzodioxole
m. 5-phenoxymethyl benzodioxole
n. 5-ethoxy 6-nitro benzodioxole;
o. 5-(3,6,9-trioxa undecyl-2) oxy benzodioxole
p. 6-ethyl 5-(3,6,9-trioxa undecyl-2) oxy benzodioxole 9. Benzodioxoles having an acetal function defined by formula IX

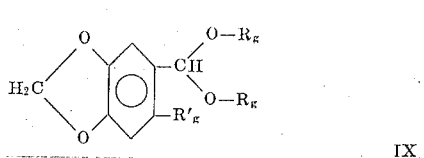

IX in which $R_g$ is an alkyl group of one to four carbon atoms, or alkoxy alkyl of two to seven carbon atoms or alkoxyalkoxy alkyl of 4 to 10 carbon atoms, and $R_g'$ is hydrogen, chlorine, bromine, fluorine, nitro or low alkyl. Such compounds are, for example:
a. 5-(dimethoxy)methyl benzodioxole
b. 5-(diisobutoxy)methyl benzodioxole
c. 5-bis(2-ethoxy ethoxy) methyl benzodioxole
d. 5-bis (2-butoxy ethoxy)methyl benzodioxole
e. 5-bis(2-butoxy propoxy)methyl benzodioxole
f. 5-bis(3,6-dioxa decyloxy)methyl benzodioxole g. 5-bis(5-methyl 4,7-dioxa dodecyloxy)methyl benzodioxole
h. 5-(dipropyloxy)methyl benzodioxole
i. 5-(dipropyloxy)methyl 6-chloro benzodioxole
j. 5-(dipropyloxy)methyl 6-nitro benzodioxole
k. 5-(dipropyloxy)methyl 6-methyl benzodioxole;

10. Benzodioxoles having a carbonic function defined by formula X

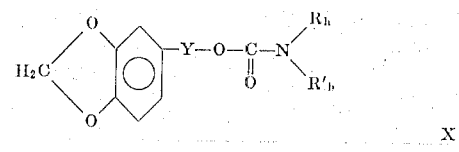

X in which Y is as defined in (5) above, and $R_h$ and $R_h'$ are the same or different and are each hydrogen or alkyl of one to four carbon atoms, or are, together with the nitrogen atoms, piperidino, morpholino or pyrrolidino. Such compounds are, for example, as follows:

a. 5-carbamoyl oxy benzodioxole
b. 5-(N-methylcarbamoyl oxy) benzodioxole
c. 5-(N-butylcarbamoyl oxy) benzodioxole
d. 5-(N,N-dipropylcarbamoyl oxy) benzodioxole
e. 5-(N,N-pentamethylene carbamoyl oxy) benzodioxole
f. 5-carbamoyl oxy methyl benzodioxole
g. 5-(N,N-dimethylcarbamoyl oxy ethyl) benzodioxole
h. 5-(2-N,N-diethylcarbamoyl oxy ethyl) benzodioxole
i. 5-(2-N-butylcarbamoyl oxy butyl) benzodioxole
j. 5-(2-N,N-tetramethylene carbamoyl oxy propyl) benzodioxole
k. 5-(3-N-methylcarbamoyloxy butene-1 yl) benzodioxole
l. 5-morpholinocarbamoyloxymethyl benzodioxole
m. 5-N-isopropylcarbamoyloxy 6-methyl benzodioxole
n. 5-N-propylcarbamoyloxy 6-nitro benzodioxole
o. 5-N-ethylcarbamoyloxy 6-chloro benzodioxole
p. 5-piperidinocarbonyloxy benzodioxole;

11. Benzodioxoles carrying a dioxane ring defined by formula XI

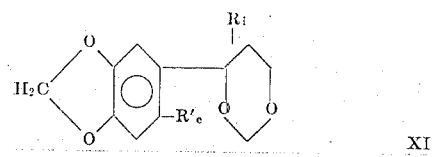

XI in which $R_e'$ is as defined in (7) above and $R_i$ is hydrogen, methyl or ethyl. Such compounds are, for example:
a. 5-(4-dioxane -1,3 yl-4) benzodioxole
b. 5-(4-dioxane -1,3 yl-4) 6-methyl benzodioxole
c. 5-(4-dioxane -1,3 yl-4) 6-propyl benzodioxole
d. 5-[(4-(5-methyl dioxane-1,3)yl] benzodioxole
e. 5-[(4-(5-methyl dioxane-1,3)yl] 6-propyl benzodioxole
f. 5-[(4-(5-ethyl dioxane-1,3)yl] benzodioxole 12. Benzodioxole derivatives of tetraline defined by formula XII

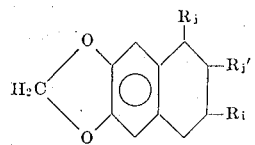

XII in which $R_i$ is as defined in (11) above, and $R_j$ and $R_j'$ are the same or different and are each hydrogen, methyl, carboxy or alkoxycarbonyl containing in toto two to five carbon atoms. Such compounds are for example:

a. 5,6,7,8-tetrahydro naphtho-(2,3-d) 1,3-dioxole
b. 5,6,7-trimethyl 5,6,7,8-tetrahydro naphtho (2,3-d) 1,3-dioxole
c. 6,7-dimethyl 5,6,7,8-tetrahydro naphtho (2,3-d) 1,3-dioxole
d. 5,6-dicarboxy 5,6,7,8-tetrahydro naphtho (2,3-d) 1,3-dioxole
e. 5,6-dicarboxy 7-methyl 5,6,7,8-tetrahydro naphtho(2,3-d) 1,3-dioxole
f. 5,6-bis(ethoxy-carbonyl) 7-methyl 5,6,7,8-tetrahydro naphtho(2,3-d) 1,3-dioxole
g. 5,6-bis(propoxycarbonyl) 7-methyl 5,6,7,8-tetrahydro naphtho(2,3-d) 1,3-dioxole
h. 5,6-bis(butoxycarbonyl) 7-ethyl 5,6,7,8-tetrahydronaphtho(2,3-d) 1,3-dioxole 13. Benzodioxole derivatives of dioxabicyclootane defined by formula XIII

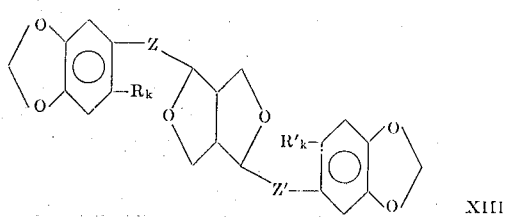

XIII in which Z and Z' are the same or different and are each a direct bond or an oxygen atom; $R_k$ and $R_k'$ are the same or different and are hydrogen, methyl or methoxy. Such compounds are, for example:

a. 2,6-bis(5-benzodioxole-1,3 yl 3,7-dioxa bicyclo (3,3,0) octane
2,6-bis(5-benzodioxole-1,3 yl oxy) 3,7-dioxa bicyclo (3,3,0) octane
c. 2-(5-benzodioxole-1,3 yl) 6-(5-benzodioxole-1,3 yl oxy) 3,7-dioxabicylo(3,3,0) octane
d. 2-(5-benzodioxole-1,3 yl) 6-(5-(6-methoxy benzodioxole-1,3 yl)) 3,7-dioxa bicyclo(3,3,0)octane
e. 2-(5-benzodioxole-1,3 yl)6-(5-(6-methyl-6 benzodioxole-1,3 yl)) 3,7-dioxa bicyclo (3,3,0)octane
f. 2,6-bis (5-(6-methoxy benzodioxole-1,3 yl)) 3,7-dioxa bicyclo (3,3,0)octane
g. 2,6-bis (5-(6-methyl benzodioxole-1,3 yl)) 3,7-dioxa bicyclo (3,3,0)octane 14. Benzodioxole derivatives of indole defined by formula XIV

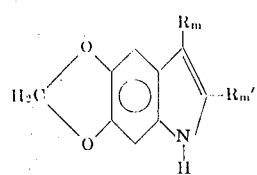

XIV in which $R_m$ is hydrogen, alkyl of one to four carbon atoms or alkoxy of one to four carbon atoms, each of these groups optionally bearing a group

as defined in (10) above, $R_m'$ is hydrogen, alkyl of one to four carbon atoms, alkoxy of one to four carbon atoms, alkanoyl of two to four carbon atoms or benzoyl. Such compounds are, for example, the following a. (1,3 dioxolo) [4,5-f]indole
b. 3-methyl (1,3 dioxolo) [4,5-f] indole
c. 3-ethyl (1,3 dioxolo) [4,5-f] indole
d. 3-butyl (1,3 dioxolo) [4,5-f] indole
e. 2.3-dimethyl (1,3 dioxolo) [4,5-f]indole
f. 3-methoxy (1,3 dioxolo) [4,5-f] indole
g. 3-isobutoxy (1,3 dioxolo) [4,5-f] indole
h. 2,3-dimethoxy (1,3 dioxolo) [4,5-f]indole
i. 2-ethyl 3-methoxy (1,3 dioxolo) [4,5-f]indole
j. 3-(2-N,N-dimethylamino ethyl) (1,3 dioxolo) [4,5-f] indole
k. 3-(3-N-ethylamino propyl) (1,3 dioxolo) [4,5-f] indole
l. 3-(2-amino ethoxy) (1,3 dioxolo) [4,5-f]indole
m. 3-(2-N,N-diethylamino ethoxy) (1,3 dioxolo) [4,5-f] indole
n. 3-(2-pyrrolidino ethoxy) (1,3 dioxolo) [4,5-f] indole
o. 3-(2-piperidino ethoxy) (1,3 dioxolo) [4,5-f] indole
p. 2-acetyl 3-(2-pyrrolidino ethoxy) (1,3 dioxolo) [4,5-f] indole
q. 2-butyryl 3-(2-pyrrolidino ethoxy) (1,3 dioxolo) [4,5-f] indole
r. 3-benzoyl 3-(2-pyrrolidino ethoxy) (1,3 dioxolo) [4,5-f] indole;

15. Benzodioxoles carrying an imine function defined by formula XV

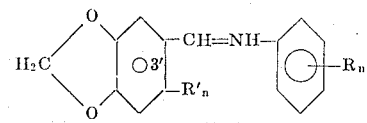

XV in which $R_n$ represents one to three substituents optionally chosen from alkyl of one to four carbon atoms, alkoxy of one to four carbon atoms, chloro, bromo, nitro, hydroxy and methyl thio. Such compounds are, for example, the following anilines N-substituted by piperonylidene a. aniline
b. 4-methyl aniline
c. 4-butyl aniline
d. 2,4-dimethyl aniline
e. 4-methoxy aniline
f. 2,4-dimethoxy aniline
g. 2,4,6-trimethoxy aniline
h. 4-butoxy aniline
i. 3-nitro aniline
j. 5-chloro 2,4-dimethoxy aniline
k. 2-chloro aniline
l. 2,3-dichloro aniline m. 4-chloro 2-methyl aniline
n. 4-methylthio aniline
o. 2-bromo 4-nitro aniline
p. 2-hydroxy aniline
q. 5-chloro 2-methyl aniline
r. 4-bromo aniline
s. 2,5-dichloro aniline
t. 2,3,5-trichloro aniline
u. 2,4,6-trimethyl aniline
v. 4-t-butyl aniline
and the following anilines
w. N-(3'-chloro piperonylidene)-aniline
x. N-(3'-methyl piperonylidene)-(4-methyl aniline)
y. N-(3'-nitro piperonylidene)-(3-nitro aniline);

16. Salt derivatives of benzodioxoles, having an acid or phenolic function defined in (3), (5) and (12) above, these salts containing as cation a metal such as sodium, potassium, calcium, zinc, cadium, copper, nickel, cobalt, iron, manganese, silver, lead, barium, strontium and aluminium, or an ammonium ion derived from ammonia, an amine derivative containing one to three alkyl groups and one to four carbon atoms, for example methylamine, dimethylamine, trimethylamine, diethylamine, triethylamine, butylamine, dibutylamine and tributyl amine, or a heterocyclic nitrogen derivative, e.g. pyridine, morpholine, N-methyl morpholine, piperidine and pipecolines.

Such salts are, for example, the following:
The sodium salts of compounds III (a), III (g), III (n), III (r), V (a), XII (d) and XII (e).
The ammonium salts of compounds III (a), III (h), III (m), III (p), V (i) and XII (d).
The neutral zinc salts of compounds III (a), V (a) and XII (e).

The use of these salts is of particular value when the phosphoric ester used has already undergone some protonisation; the salt introduced as stabiliser then acts as a first stage as a neutraliser for the acid phosphoric ester by exchanging its cation therewith for a proton; this neutralisation favours the stabilisation since it has been observed by the applicants that the preservation of phosphoric esters is better when they do not contain any acid by-products; the benzodioxole, having lost its cation, keeps its stabilising properties and then acts for a second time.

17. Salt derivatives of benzodioxoles having a basic function defined in (6) and (14) above, these salts being formed with a mineral acid such as hydrochloric, sulphuric, carbonic, boric, hydrobromic or phosphoric acid, or an organic mono- or di-carboxylated acid such as acetic, propionic, benzoic, succinic, adipic, phthalic, maleic or phenylacetic acid. Such salts are, for example, the following:

(a) to (o): the chloride, sulphate, carbonate, borate, bromide, hydrogen phosphate, dihydrogen phosphate, acetate, propionate, benzoate, succinate, adipate, phthalate, maleate and phenylacetate of 5-(N,N-dimethylamino)benzodioxole (VI(a))

(p) to (z) and (a') to (d'): the salts of the same acids and in (a) to (o) just noted of (1,3-dioxols [4,5-f] indole (XIV(a))

The solvents for the phosphoric ester may advantageously be aliphatic alicyclic or aromatic hydrocarbons, which are solid or liquid at ambient temperature with or without pressure. Such solvents may be used separately or in admixture. Their solvent action for the phosphoric ester and/or the benzodioxole can be optionally reinforced by the addition of co-solvents which may be selected from aliphatic ketones, hydroxylated compounds, ethers, esters, amides, nitriles and halogenated hydrocarbons containing at most 12 carbon atoms. Other solvents usable in compositions according to the present invention are halogenated hydrocarbons containing at most 12 carbon atoms, ethers and esters formed between aliphatic, cycloaliphatic or aralkoylic alcohols or phenols, and aliphatic acids or di-acids such as phthalic acid, sebacic acid or adipic acid, or even non-pesticidal phosphoric esters such as the phosophoric tri-esters of methyl, ethyl, butyl, octyl, decyl, dodecyl, phenyl, cresyl, diphenyl, tert. butylphenyl etc. Solvents used in the compositions according to the present invention may also be solid compounds, for example synthetic organic resins such as homopolymers and copolymers of vinyl derivatives (acetate, propionates, butyrate, oxides, formal, acetal, butyral, chloride etc.) and/or vinylidene or alkene derivatives (ethylene, propylene, butylene etc.) and/or styrene, and/or vinyl pyrrolidone, and/or cellulose derivatives (methyl oxide, ethyl oxide, benzyl oxide, acetate, propionate, butyrate, phthalates, nitrate, etc.) and/or isoprene and/or butadiene and/or acrylic or methacrylic esters and/or allyl esters (phthalate, isophthalate, maleate, cyanurate, etc) and also synthetic resins of the type arising from the interaction of compounds with reactive groups, as is the case with the so called "epoxy" resins, formed by the condensation of an epoxide with a polyphenol, polyester resins formed by the action of a polyacid with a polyol, polyurethane resins formed by condensation of a polyisocyanate with a polyol, or coumarone-indene type resins.

Solid compounds serving as solvents may also be natural resins, for example colophony, shellac, tallol or a waxy resin.

Amongst mineral adjuvants which may be introduced into compositions according to the present invention, the following should be noted: brick, pumice, vermiculite, kaolin, dried clay, calcium carbonate, pyrophyllite, dolomite, glass fibre, plaster, talc, natural silica, fossil or otherwise, synthetic silica and metallic oxides. Among inert organic adjuvants which may be introduced into the compositions according to the present invention there should be noted: wood flour, cellulose fibre, starch, maize, faecula, sugars and/or diluents with little solvent action such as paraffin, these being optionally modified in their properties by the addition of synthetic organic resins and/or salts formed by alkoylamino-alkoylamines and aliphatic acids, and/or amine derivatives of montmorillonite such as bentones.

The complementary stabilisers are advantageously selected from sulphur, divalent sulphur compounds, oxiranes and azoic compounds or their metalliferous derivatives. Compositions according to the present invention can also contain one or more natural or synthetic aromatic materials, complementary active agents such as an acaricide, an insectifugal agent, a bird-repellent, an antifungal agent, a vegetable growth-regulating agent, a herbicide or a bactericide.

Thus formulated, the composition of the present invention may be solid or liquid. It can be disposed on a solid porous or fibrous support. This support may be formed, for example, by a paper, a felt of wool, cotton and/or synthetic fibre, compressed cellulose such as wood fibre, cereals, alfalfa or cotton, a felt card, a card of old papers or a card of glass fibre.

Such a composition is preferably used as an insecticidal agent. The presence of the benzodioxole as a stabilizer confers to the phosphoric acid ester contained in the composition a better resistance to decomposition which may be due to the presence of water contained in the composition and to ambient humidity, as is shown by the following exemplary experiments.

EXPERIMENT A 10 cm by 10 cm squares cut from a cellulose card made by the French company FIORONI S.A. under their reference 200 were used. At the time of use, the card weighed 870 g/m$^2$, i.e. 8.7 gm per square. The card squares were divided into three groups of three units numbered A-0 to A-2. Cards A-0 were impregnated with 12.5 g DDVP and the other cards were impregnated with 12.5 g of a solution in DDVP of one of the following compounds at a concentration of 1%.

A-1: 5(2-octylsulphinylpropyl) benzodioxole.
A-2: 5-propyl-6-(2,5,8-trioxadodecyl) benzodioxole.

The thus impregnated squares were suspended in a room of which the temperature was maintained at 22° ± 2°C, and the relative humidity of which was about 40.

At the end of 15 days the quantity of DDVP destroyed by hydrolysis was measured potentio metrically (it having been established elswhere that hydrolysis of DDVP in the conditions given above leads to an acid phosphoric ester and that the potentiometric measurement of the single acidity or of the first acidity of this ester allows the quantity of DDVP hydrolysed to be measured).

Account was taken of the acidity present in the DDVP and this was deducted from the results obtained.

The percentage quantities of DDVP decomposed by hydrolysis which were formed are compiled in the table below. In the table, the values qualified by I represent the spread of results in each test:

| A-0 | A-1 | A-2 |
|---|---|---|
| 29.9 | 0.2 | 0.4 |
| ±1.9 | ±0.03 | ±0.1 |

EXPERIMENT B

Squares of card were used as in experiment A, but of size 5 × 10 cm and bonded in pairs, back to back, by staples, at the time of use, the card weighted 895 g/m$^2$; these double cards were divided into four groups numbered B-0 to B-3. Each square B-0 was impregnated with 12.5 g of DDVP and the other doubled cards were each impregnated with 12.5 g of a 1.5% solution, in DDVP, of one of the following compounds:
B-1 5-allyl benzodioxole
B-2 5-formyl benzodioxole The thus impregnated cards were suspended in a room of which the temperature was kept at 22° ± 2°C and of which the relative humidity was about 70.

At the end of 15 days, the quantity of DDVP destroyed by hydrolysis was measured as in Experiment A, the percentage quantities of DDVP destroyed so determined are indicated in the following table.

| B-0 | B-1 | B-2 |
|---|---|---|
| 33.8 | 0 | 0.7 |
| ±2.9 | — | ±0.2 |

EXPERIMENT C

Doubled cards were used as in experiment B but in which the card weight was 885 g/m$^2$. These doubled cards were divided into four series C-0 to C-3. The doubled cards C-0 were each impregnated with 12.5 g of DDVP, the other doubled cards being each impregnated with 12.5 g of a 2% solution in DDVP of one of the following compounds:

C-1: 5-(3,6,9-trioxa undecyl-2-oxy) benzodioxole
C-2: 5,6-bis(propyoxycarbonyl)-7-methyl-5,6,7,8-tetrahydro naphtho(2,3,-d)-1,3-dioxole
C-3: an equimolecular mixture of 2,6-bis(5-benzodioxole-1,3-yl)-3,7-dioxabicyclo(3,3,0) octane and 2-(5-benzodioxole-1,3-yl)-6-(5-benzodioxole-1,3-yl-oxy)-3,7-dioxabicyclo(3,3,0) octane The thus impregnated cards were suspended in a room the temperature of which was kept at 22 ± 2°C and of which the relative humidity was about 65.

At the end of 15 days, the percentage quantity of DDVP destroyed was measured as in Experiment I and is tabulated as follows:

| C-0 | C-1 | C-2 | C-3 |
|---|---|---|---|
| 45.8 | 0.02 | 2.9 | 1.9 |
| ±2.5 | ±0.002 | ±0.4 | ±0.2 |

EXPERIMENT D

Doubled cards were used as in Experiment B, but of weight 890 g/m$^2$. These doubled cards were divided into nine series numbered D-0 to D-8; the cards D-0 were each impregnated with 12.5 g of a 30% solution in DDVP of one of the following compounds:

D-1: 5-hydroxy benzodioxole
D-2: 5-hydroxymethyl benzodioxole
D-3: 5-(propen-1 yl) benzodioxole
D-4: 5-acetonyl benzodioxole
D-5: 5-(3-oxo-buten-1 yl) benzodioxole
D-6: 5-cyanomethyl benzodioxole
D-7: 5-(2-amino propyl) benzodioxole
D-8: 5-(5-methyl 4-dioxane-1,3 yl) benzodioxole The thus impregnated cards were suspended in a room of the temperature of which was kept at 22° + 2°C and the relative humidity of which was between 70 and 75.

At the end of 12 days, the percentage quantities of DDVP destroyed were measured as in Experiment A and tabulated as follows:

| D-0 | D-1 | D-2 | D-3 | D-4 | D-5 | D-6 | D-7 | D-8 |
|---|---|---|---|---|---|---|---|---|
| 41.3 | 0 | 0.3 | 0 | 9.2 | 0.8 | 3.4 | 0 | 2.1 |
| ±1.1 | — | ±0.02 | — | ±1.0 | ±0.07 | ±0.2 | — | ±0.2 |

EXPERIMENT E

Doubled cards as described in Experiment B were used, but of weight 910 g/m². These cards were divided into six series numbered E-0 to E-5. The double cards E-0 were each impregnated with 12.5 g of DDVP; the other doubled cards were each impregnated with 12.5 g of a solution in DDVP of the following compounds in the concentrations given:

E-1 2% of 5-benzoylmethyl benzodioxole
E-2 2% of benzodioxole
E-3 2% of 5-bromo benzodioxole
E-4 2% of 5-nitrobenzodioxole
E-5 5% of 5-cyanobenzodioxole.

The thus impregnated cards were suspended in a room the temperature of which was kept at 22° ± 2°C and the relative humidity of which was about 74.

At the end of 15 days the percentage quantities of DDVP destroyed were measured as in Experiment A and tabulated as follows:

| E-0 | E-1 | E-2 | E-3 | E-4 | E-5 |
|---|---|---|---|---|---|
| 49.5 ±0.8 | 0 — | 4.1 ±0.6 | 4.3 ±0.5 | 0.6 ±0.03 | 1.7 ±0.5 |

EXPERIMENT F

Doubled cards were used as in Experiment B but of weight 835 g/m². These cards were divided into 8 series numbered F-0 to F-7. Each card of F-0 was impregnated with 12.5 g DDVP while the other cards were each impregnated with a 3% solution in DDVP of one of the following compounds:

F-1 5(2-N-phenylcarbamyl ethyl) benzodioxole
F-2 5[2-(4-methylbenzoyl)vinyl]benzodioxole
F-3 5-propyl benzodioxole
F-4 5(2-nitrovinyl) benzodioxole
F-5 N-piperonylidene (4-methyl aniline)
F-6 N-piperonylidene (5-chloro-2,4 dimethoxy aniline)
F-7 5-methoxy benzodioxole.

The thus impregnated cards were suspended in a room the temperature of which was kept at 21° ± 1°C and the relative humidity of which was about 65.

At the end of 15 days, the percent quantities of DDVP destroyed were measured as noted in Experiment A and tabulated as follows:

| F-0 | F-1 | F-2 | F-3 | F-4 | F-5 |
|---|---|---|---|---|---|
| 34.2 ±0.8 | 0 — | 0.2 ±0.02 | 0 — | 1.3 ±0.1 | 3.4 ±0.3 |

| F-6 | F-7 |
|---|---|
| 7.1 ±0.4 | 0 — |

EXPERIMENT G

Doubled cards were used as described in Experiment B above but in which the weight was 910 g/m². These cards were divided into six series called G-0 to G-5. The double cards G-0 were each impregnated with 12.5 g of DDVP.

The other double cards were each impregnated with 12.5 g of 4% solution in DDVP of one of the following compounds:

G-1: sodium 7-methyl-5,6,7,8-tetrahydronaphtho[2,3-d]1,3 dioxole 5,6-dicarboxylate
G-2: zinc 3(5-benzodioxole) acrylate
G-3: piperidine 3-(5-benzodioxole) acrylate
G-4: lead 3-(5-benzodioxole) acrylate
G-5: piperidine 5-benzodioxole carboxylate The thus impregnated cards were suspended in a room the temperature of which was kept at 22° ± 2°C and of which the relative humidity was about 75.

At the end of 10 days, the percentage quantities of DDVP destroyed were measured as given in Experiment A and tabulated as follows:

| G-0 | G-1 | G-2 | G-3 | G-4 | G-5 |
|---|---|---|---|---|---|
| 36.8 | 1.9 | 2.8 | 5.6 | 5.0 | 5.4 |

EXPERIMENT H

Doubled cards were used as in Experiment B but of weight 910 g/m². The cards were divided into three series denoted H-0, H-1, and H-2. The doubled cards H-0 were each impregnated with 12.5 g of DDVP.

The other double cards were each impregnated with 12.5 g of a solution in DDVP of the hydrochloride of 2-benzoyl 3-(2-pyrrolidinoethoxy) 1,3-dioxolo)[4,5-f]indole at the following concentrations:

H-1 0.2%
H-2 0.5%

The thus impregnated cards were suspended in a room the temperature of which was kept at 22 ± 2°C, and of which the relative humidity was about 80.

At the end of 15 days, the percentage quantities of DDVP destroyed were measured as noted in Experiment A and the results tabulated as follows:

| H-0 | H-1 | H-2 |
|---|---|---|
| 57.5 ±6.8 | 1.4 ±0.1 | 1.1 ±0.1 |

The results of Experiments A, B, C, D, E, F, G and H show clearly that what extent DDVP is susceptible to humidity when unprotected: they also show that the hydrolysis can be reduced by a substantial amount when a benzodioxole is added to this phosphoric ester.

EXPERIMENT I

Doubled cards were used as described in Experiment B but of weight 905 g/m². These doubled cards were divided into six series I-0 to I-5. Each card I-0 was impregnated with 12.5 g of DDVP. The other double cards were each impregnated with 12.5 g of a solution in DDVP as follows:

I-1 : 1.7% of 1-(4-methyl-2-nitrophenyl azo)-3-ethoxycarbonyl-4,4-dimethyl-1,2,6-dioxo cyclohexane.
I-2 : 1.7% of 5-allyl benzodioxole
I-3 : 1% of 5-allyl benzodioxole + 0.7% of 1-(4-methyl-2-nitro phenylazo)-3-ethoxycarbonyl-4,4-dimethyl-2,6-dioxo cyclohexane.
I-4 : 1.7% of 5-(3-oxo-butene-1 yl) benzodioxole
I-5 : 1% of 5-3-oxo butene-1 yl) benzodioxole + 0.7% of 1-nitro-4 methyl-2 phenylazo-3-ethoxycarbonyl-4,4-dimethyl-2,6-dioxo-cyclohexane.

The thus impregnated cards were suspended in a room the temperature of which was kept at 22° ± 2°C, and of which the relative humidity was about 77.

At the end of 21 days, the quantities of DDVP destroyed were measured as given in Experiment A and tabulated as follows:

| I-0 | I-1 | I-2 | I-3 | I-4 | I-5 |
|---|---|---|---|---|---|
| 45.1 ±0.7 | 16.2 ±1.9 | 1.2 ±0.3 | 0.7 ±0.1 | 7.1 ±1.3 | 0.9 ±0.1 |

The results of this experiment show the value of mixtures of stabilisers according to the invention with stabilisers of the family of azoic compounds. It can in effect be seen from the foregoing results that a synergistic effect is present with these two types of stabilisers.

EXPERIMENT J

Doubled cards were used as in Experiment B but of weight 905 g/m². These double cards were divided into eight series numbered J-0 to J-7. Cards J-0 were each impregnated with 12.5g of DDVP, the other doubled cards were each impregnated with 12.5 g of a solution in DDVP as follows:

J-1 : 0.2% of elemental sulphur
J-2 : 1.7% of 5-allyl benzodioxole
J-3 : 1.5% of 5-allyl benzodioxole + 0.2% of elemental sulphur
J-4 : 1.7% of 5-(3-oxo butene-1 yl) benzodioxole
J-5 : 1.5% of 5-(3-oxo butene-1 yl) benzodioxole +0.2% of elemental sulphur.
J-6 : 1.7% of 5-(propene-1 yl) benzodioxole
J-7 : 1.5% of 5- (propene-1 yl) benzodioxole +0.2% of elemental sulphur.

The thus impregnated cards were suspended in a room the temperature of which was kept at 22° ± 2°C and the relative humidity of which was about 77.

At the end of 21 days the percentage quantities of DDVP destroyed were measured as given in Experiment A and tabulated as follows:

| J-0 | J-1 | J-2 | J-3 | J-4 | J-5 | J-6 | J-7 |
|---|---|---|---|---|---|---|---|
| 45.1 ±0.7 | 9.1 ±1.8 | 1.2 ±0.3 | 0.5 ±0.02 | 7.1 ±1.3 | 1.3 ±0.2 | 0.5 ±0.05 | 0.02 ±0.00 |

The results of this experiment show the value of mixtures of stabilisers according to the present invention with a complementary stabiliser such as sulphur. There can, in effect, be seen from the results above, a synergistic effect with these two types of stabiliser.

EXPERIMENT K

Doubled cards were used as in Experiment B but of size 7 × 10 cm. These cards were divided into two series K-0 and K-1. The doubled cards K-0 were each impregnated with 16.6 g of a composition containing 50% by weight DDVP and 50% by weight of a mixture of 3 parts by weight vaseline oil and 1 part by weight stearone.

The double cards K-1 were each impregnated with 16.6 g of the same composition but in which 2.1% of the vaseline oil/stearone mixture, based on the weight of the composition, had been replaced by 2% 5-allyl benzodioxole and 0.1% of 1(4-methyl-2-nitro phenylazo)-3-ethoxycarbonyl-4,4-dimethyl-2,6-dioxo cyclohexane.

The so impregnated double cards were each placed in a sachet made from a polyethylene/aluminium complex, the polyethylene face inwards, and the sachets were hermetically sealed by welding. After 8 months storage at 40°C the sachets were opened and their contents submitted to analysis as set out in Experiment A. The percentage quantities of DDVP decomposed were tabulated as follows:

| K-0 | K-1 |
|---|---|
| 16.7 | 4.9 |

EXPERIMENT L

Four series of compositions were prepared containing 50% by weight DDVP; these series were called L-0 to L-3. The composition L-0 contained 50% by weight xylene. The compositions L-1 to L-3 contained the following compounds, the balance to 100% being xylene:

L-1 : 2% of 5-allyl benzodioxole
L-2 : 1% of elemental sulphur
L-3 : 2% of 5-allyl benzoidioxole and 1% of elemental sulphur.

These compositions were each enclosed in a sealed flask and placed at a temperature of 60°C; after 36 days, the flasks were opened and their contents analysed in the fashion described in Experiment A. The percentage quantities of DDVP destroyed are tabulated as follows:

| L-0 | L-1 | L-2 | L-3 |
|---|---|---|---|
| 14.7 | 3.9 | 2.6 | 1.2 |

The results of experiments K and L show the value of the stabilisers of the present invention for preserving phosphoric esters and compositions containing them during storage. It also confirms the value of associating stabilisers according to the invention with other stabilisers.

EXPERIMENT M

Cards of size 5 × 10 cm were used as in Experiment B, but left as a single thickness. These cards were divided into four series M-0 to M-3. The cards M-0 were each impregnated with 6g of 0(2,2-dibromovinyl)-0,0-dimethyl phosphate. The other cards were each impregnated with 6 g of a 2% solution of one of the following compounds in 0-(2,2-dibromovinyl)-0,0-dimethyl phosphate:

M-1 5-(3-oxo-buten-1-yl) benzodioxole
M-2 5-(2-aminopropyl) benzodioxole
M-3 5-(3,6,9-trioxa-undecyl-2-oxy)-benzodioxole The thus impregnated cards were suspended in a room the temperature of which was kept at 22° ± 2°C, the relative humidity of which was about 60.

At the end of 16 days the percentage quantities of ester destroyed were measured potentiometrically. Account was taken of the initial acidity present in the phosphoric ester (equivalent to 7.4% of ester) and this was deducted from the results obtained.

| M-0 | M-1 | M-2 | M-3 |
|-----|-----|-----|-----|
| 14.8 | 6.0 | 3.4 | 2.6 |

EXPERIMENT N

Cards of size 5 × 10 cm were used as described in Experiment B, but left at a single thickness. These cards were divided into five series N-0 to N-4. The Cards N-0 were each impregnated with 6g of 0(2,2-dichlorovinyl)-0,0-diethyl phosphate. The other cards were each impregnated with 6g of a 2% solution of one of the following compounds in 0(2,2-dichlorovinyl)0,0-diethyl phosphate.

N-1 5(3-oxo-buten-1-yl) benzodioxole
N-2 5(2-aminopropyl) benzodioxole
N-3 5(3,6,9-trioxaundecyl-2-oxy) benzodioxole
N-4 5-allyl benzodioxole.

The thus impregnated cards were suspended in a room the temperature of which was kept at 22°± 2°C and the relative humidity of which was about 60.

After 48 days, the percentage quantities of ester destroyed were measured as noted in Experiment A and tabulated as follows (initial acidity corresponding to 2.5% of the ester has been deducted):

| N-0 | N-1 | N-2 | N-3 | N-4 |
|-----|-----|-----|-----|-----|
| 7.1 | 2.9 | 1.4 | 4.3 | 2.5 |

Several formulations will now be described in order to illustrate, though not to limit, the scope of the invention. For simplicity of expression, the benzodioxoles used are denoted as follows:

benzodioxole A : 5-allyl benzodioxole
benzodioxole B : 5-(propene-1 yl) benzodioxole
benzodioxole C : 5-hydroxy benzodioxole
benzodioxole D : 5-(3,6,9-trioxa undecyl-2 oxy) benzodioxole
benzodioxole E : 5-(3-oxo butene-1 yl) benzodioxole The sulphur compounds used as complementary stabilisers are denoted as follows:

sulphur compound A : 2-mercapto benzothiazole
sulphur compound B : zinc salt of 2-mercapto benzothiazole
sulphur compound C : bis(N,N-dimethylthiocarbamoyl)sulphide
sulphur compound D : bis (N,N-dimethylthiocarbamoyl)disulphide
sulphur compound E : thioacetamide
sulphur compound F : zinc N,N-dimethyldithio carbamate
sulphur compound G : 2-benzothiazolyl disulphide The azoic compounds used as complementary stabilisers are denoted as follows, with the exception of azobenzene which is referred to as such:

diazine A : 1-4(phenylazo phenylazo)2-ethylamino naphthalene
diazine B : 1-(4-methyl-2-nitro phenylazo)-3-ethoxycarbonyl-4,4-dimethyl-2,6-dioxo cyclohexane
diazine C : 1-phenylazo-2-naphthol
diazine D : 1-phenylazo N,N-diethylaniline
diazine E : chromium complex (1:2), in admixture of the following azoic compounds:
  1-(2-hydroxy-5-nitro phenylazo)-2-naphthol, sodium salt (0.4 mole)
  1-(2-hydroxy-4-nitro phenylazo)-2-naphthol, sodium salt (0.3 mole)
  1-(2-hydroxy-3-nitro-5-ter, amyl-phenylazo)-2-naphthol sodium salt (0.3 mole)

In the tables in the following examples, values are expressed in weight percent throughout.

EXAMPLES 1 to 10

Insecticidal compositions comprising DDVP as phosphoric ester, and at least one benzodioxole as principal stabiliser therefor, the compositions sometimes also containing a solvent for the ester and/or a complementary stabiliser chosen from sulphur, sulphur compounds, oxiranes, and azoic compounds.

TABLE I

| | 1 | 2 | 3 | 4 | 5 | 6 | 7 | 8 | 9 | 10 |
|---|---|---|---|---|---|---|---|---|---|---|
| DDVP | 99.6 | 99.5 | 98 | 75 | 79 | 78 | 90 | 67 | 85 | 50 |
| dioctylphthalate | — | — | — | 20 | 20 | — | — | — | — | — |
| dibutylsebacate | — | — | — | — | — | 20 | — | — | — | — |
| diisoctyladipate | — | — | — | — | — | — | 9 | 32 | 12 | 47 |
| octyl epoxystearate | — | — | — | 4 | 0.1 | — | — | — | — | — |
| azobenzene | — | — | — | — | 0.1 | — | — | — | — | — |
| diazine E | — | — | — | — | — | 0.5 | — | — | — | — |
| sulphur | 0.2 | — | — | — | — | — | 0.5 | — | — | — |
| sulphur compound A | — | — | — | 0.5 | — | — | — | — | — | — |
| sulphur compound D | — | — | — | — | — | 0.5 | — | — | — | — |
| sulphur compound G | — | — | — | — | — | — | — | — | 2 | — |
| benzodioxole A | — | — | — | — | 0.8 | — | 0.5 | — | — | — |
| benzodioxole B | 0.2 | — | — | 0.5 | — | — | — | 1 | — | — |
| benzodioxole D | — | — | 2 | — | — | — | — | — | 1 | — |
| benzodioxole E | — | 0.5 | — | — | — | 1 | — | — | — | 3 |

EXAMPLES 11 to 20

Insecticidal compositions comprising DDVP as phosphoric ester at least one benzodioxole as principal stabiliser therefor, a vaseline or paraffin oil as solvent, a heavy alkanone as co-solvent, and in some cases a complementary stabiliser chosen from sulphur, sulphur compounds, oxiranes and azoic compounds.

TABLE II

| DDVP | 11<br>50 | 12<br>50 | 13<br>50 | 14<br>60 | 15<br>75 | 16<br>75 | 17<br>40 | 18<br>25 | 19<br>50 | 20<br>50 |
|---|---|---|---|---|---|---|---|---|---|---|
| vaseline oil (a) | — | — | 35 | — | — | — | 43 | — | — | — |
| paraffin oil (a') | 35 | 35 | — | 29 | 17 | 17 | — | 60 | 35 | 35 |
| laurone | — | — | 13 | — | 6 | 6 | — | 12 | — | — |
| palmitone | — | — | — | 10 | — | — | — | — | — | — |
| stearone | 11.9 | 11.9 | — | — | — | — | 14 | — | 12 | 12 |
| epoxidised soya oil | — | — | 1 | — | — | — | — | — | — | 2 |
| diazone B | 0.1 | 0.1 | — | — | — | — | — | 0.5 | — | — |
| diazone C | — | — | — | — | 0.5 | 0.2 | — | — | — | — |
| sulphur | 1 | 1 | — | — | — | — | — | — | — | 0.1 |
| sulphur compound D | — | — | — | — | 0.5 | — | — | — | — | — |
| sulphur compound E | — | — | — | — | — | 0.8 | — | — | — | — |
| sulphur compound F | — | — | 0.05 | — | — | — | — | — | — | — |
| benzodioxole A | 2 | — | — | — | — | 1 | — | — | 3 | — |
| benzodioxole B | — | 2 | 0.95 | — | — | — | — | 1 | — | 0.9 |
| benzodioxole C | — | — | — | 1 | — | — | 0.3 | 0.5 | — | — |
| benzodioxole E | — | — | — | — | 1 | — | 2.7 | 1 | — | — |

(a) semi-refined oil having a density of 0.867 at 15°C and a freezing point of about −42°C.
(a') semi-refined product having a density of 0.870 at 15°C and a viscosity of 1.7° Engler at 50°C.

EXAMPLES 21 to 30

Insecticidal compositions comprising DDVP a phosphoric ester, at least one benzodioxole as principal stabiliser for this ester, a solid or semi-solid adjuvant chosen from paraffin, vaseline and petrolatum, a solvent chosen from heavy alkanones and in some cases a complementary stabiliser chosen from sulphur, sulphur compounds, oxiranes and azoic compounds.

TABLE III

| DDVP | 21<br>15 | 22<br>15 | 23<br>20 | 24<br>20 | 25<br>20 | 26<br>20 | 27<br>28 | 28<br>28 | 29<br>32 | 30<br>33 |
|---|---|---|---|---|---|---|---|---|---|---|
| ordinary paraffin 60/62° | — | — | 53 | 53 | 54 | 54 | — | — | — | — |
| ordinary paraffin 52/54° | 64.5 | 63 | — | — | — | — | — | — | — | — |
| vaseline (b) | — | — | — | — | — | — | — | — | 30 | 32 |
| petrolatum (b') | — | — | — | — | — | — | 35 | 35 | — | — |
| laurone | 19 | 18.5 | 24.5 | 24.8 | 24.5 | 24 | — | — | — | — |
| stearone | — | — | — | — | — | — | 36 | 36 | 37 | 34 |
| epichlorhydrin | — | 3 | — | — | — | — | — | — | 0.6 | — |
| diazene D | — | — | — | — | — | — | — | 0.2 | — | — |
| azobenzene | — | — | — | 2 | — | — | — | — | 0.2 | — |
| sulphur | — | — | — | — | 1.2 | — | — | — | — | — |
| sulphur compound B | — | — | — | — | — | — | 0.3 | — | — | — |
| sulphur compound C | — | — | — | — | — | — | — | 0.2 | — | — |
| sulphur compound G | — | — | 2 | — | — | — | — | — | — | — |
| benzodioxole A | — | 0.5 | — | — | — | 2 | — | — | 0.2 | — |
| benzodioxole B | — | — | 0.5 | — | 0.3 | — | — | — | — | 1 |
| benzodioxole C | — | — | — | 0.2 | — | — | — | 0.6 | — | — |
| benzodioxole E | 1.5 | — | — | — | — | — | 0.7 | — | — | — |

(b) yellow-colored technical product having a dropping point above 47°C.
(b') maroon-colored technical product having a dropping point of about 72°C.

EXAMPLES 31 to 40

Insecticidal compositions usable in wick evaporators formed by a reservoir and a wick dipping into the composition and having a part open to the atmosphere. These compositions comprise DDVP as phosphoric ester, a solvent for the ester chosen from alkanes, a co-solvent chosen from 1-chlorodecane, 3,6,9-trioxaundecane and 5,8,11-trioxapentadecane, at least one benzodioxole as principal stabiliser for the phosphoric ester and in some cases a complementary stabiliser chosen from sulphur, sulphur compounds, oxiranes and azoic compounds.

TABLE IV

| DDVP | 31<br>9.2 | 32<br>10.6 | 33<br>9.2 | 34<br>8.5 | 35<br>9.7 | 36<br>10.6 | 37<br>7.8 | 38<br>9.2 | 39<br>7.8 | 40<br>10.6 |
|---|---|---|---|---|---|---|---|---|---|---|
| n-dodecane | — | — | — | 86 | 85 | — | 86 | — | 86 | — |
| "Isopar L" (C'') | 85.3 | 84 | 86 | — | — | 84 | — | 86.4 | — | 84 |
| 1-chloro decane | — | — | 4 | — | — | — | 6 | — | 6 | — |
| 3,6,9-trioxa undecane (c) | 5 | 5 | — | — | — | 5 | — | — | — | 5 |
| 5,8,11-trioxa pentadecane (c') | — | — | — | 5 | 5 | — | — | 4 | — | — |

TABLE IV – Continued

| DDVP | 31 | 32 | 33 | 34 | 35 | 36 | 37 | 38 | 39 | 40 |
|---|---|---|---|---|---|---|---|---|---|---|
|  | 9.2 | 10.6 | 9.2 | 8.5 | 9.7 | 10.6 | 7.8 | 9.2 | 7.8 | 10.6 |
| epoxidised soya oil | — | — | — | 0.4 | — | — | — | — | — | 0.25 |
| diazene A | 0.04 | 0.05 | — | — | — | — | — | — | 0.04 | — |
| azobenzene | — | 0.1 | — | — | — | — | 0.1 | — | — | 0.05 |
| sulphur | — | — | — | — | 0.03 | — | — | — | — | — |
| sulphur compound A | — | — | — | — | — | 0.1 | — | — | 0.06 | — |
| benzodioxole B | 0.46 | — | 0.8 | — | — | — | 0.1 | — | — | 0.1 |
| benzodioxole C | — | 0.25 | — | — | 0.27 | — | — | — | 0.1 | — |
| benzodioxole E | — | — | — | 0.1 | — | 0.3 | — | 0.4 | — | — |

(c) reinforcing solvent known as diglycoldiethyl ether, and sold under the Trade Mark "Diethylcarbitol" by the U.S. Company Union Carbide Chemicals Co. of New York.
(c') reinforcing solvent known as diglycol dibutyl ether, sold under the Trade Mark "Dibutylcarbitol" by the Union Carbide Chemicals Co. aforementioned.
(C") distillation cut between 189° and 205°C of branch aliphatic hydrocarbons obtained by synthesis, containing a mixture of decane, undecane and dodecane, sold by the company Esso Standard.

EXAMPLES 41 to 50

Insecticidal compositions comprising DDVP as phosphoric ester, at least one benzodioxole as principal stabiliser therefor, and odorant material chosen from linalol, ionone, methone, linalyl acetate, orange terpenes and citron terpenes and in some cases a complementary stabiliser chosen from sulphur, sulphur compounds, oxiranes and azoic compounds.

EXAMPLES 51 to 60

Insecticidal compositions comprising DDVF as phosphoric ester, at least one benzodioxole as principal stabiliser, a synthetic thermoplastic resin as solid solvent, a heavy ester used as complementary solvent acting at the same time, in some cases as a plasticiser for the resin, and in several cases as complementary stabiliser chosen from sulphur, sulphur compounds, oxiranes and azoic compounds.

TABLE V

| DDVP | 14 | 42 | 43 | 44 | 45 | 46 | 47 | 48 | 49 | 50 |
|---|---|---|---|---|---|---|---|---|---|---|
|  | 79 | 77 | 86 | 72 | 83 | 85 | 68 | 77 | 72 | 87 |
| linalol | 7.5 | — | — | — | — | — | — | — | — | — |
| α-ionone | — | 20 | 10 | 5 | — | — | — | — | — | — |
| menthone | — | — | — | — | 15 | — | — | — | — | — |
| linalyl acetate | 7.5 | — | — | — | — | 12 | — | — | — | — |
| orange terpenes | — | — | — | 20 | — | — | 30 | 20 | — | — |
| citron terpenes | — | — | — | — | — | — | — | — | 25 | 12 |
| expoxidised soya oil | 5 | — | — | 2 | — | — | — | — | — | — |
| diazene A | — | 0.5 | — | — | — | — | — | — | — | — |
| diazene B | — | — | — | 0.5 | — | — | — | — | — | — |
| sulphur | — | — | — | — | — | — | 0.1 | — | — | — |
| sulphur compound D | — | — | — | — | — | — | — | — | 1 | — |
| benzodioxole A | 1 | — | — | — | — | 1.5 | — | — | — | — |
| benzodioxole B | — | — | — | 0.5 | — | — | — | 3 | — | — |
| benzodioxole C | — | — | — | — | 2 | 1.5 | — | — | — | 1 |
| benzodioxole D | — | — | — | — | — | — | 1.9 | — | — | — |
| benzodioxole E | — | 2.5 | 4 | — | — | — | — | 2 | — | — |

TABLE VI

| DDVP | 51 | 52 | 53 | 54 | 55 | 56 | 57 | 58 | 59 | 60 |
|---|---|---|---|---|---|---|---|---|---|---|
|  | 20 | 25 | 30 | 20 | 20 | 25 | 20 | 25 | 30 | 30 |
| polyvinyl chloride | 56 | 62 | 40 | 62 | 60 | 50 | 60 | — | — | — |
| ethylene/vinyl acetate copolymer (d) | — | — | — | — | — | — | — | 54 | — | — |
| vinyl acetate/vinyl chloride copolymer (10:90) | — | — | — | — | — | — | — | — | 50 | 54 |
| diisooctyl adiphate | 23 | — | — | — | — | — | 9 | — | — | — |
| tricresyl phosphate | — | 10 | 29 | 12 | — | — | — | — | 19 | 5 |
| methyl laurate | — | — | — | — | 5 | 9 | — | — | — | — |
| dioctyl phthalate | — | — | — | — | — | 9 | 8 | — | 10 | — |
| dimethyl succinate | — | — | — | — | — | 15 | 9 | — | — | — |
| dimethyl maleate | — | — | — | — | — | — | — | 10 | — | 10 |
| octyl epoxystearate | — | — | — | — | 1.5 | — | — | — | — | — |
| diazene C | — | 0.2 | — | — | — | — | — | — | — | — |
| sulphur | — | — | 0.2 | — | — | — | — | — | 0.1 | — |
| sulphur compound B | — | 0.3 | — | — | — | — | — | 0.4 | — | — |
| sulphur compound D | — | — | — | — | — | — | 0.3 | — | — | — |
| benzodioxole B | 1 | — | — | — | 0.2 | — | 1.6 | 0.4 | 0.9 | 0.5 |
| benzodioxole C | — | — | 0.8 | 1 | — | 2 | — | — | — | 0.5 |
| benzodioxole E | — | 2.5 | — | — | — | — | — | 0.6 | — | — |

(d) copolymer of 67% ethylene and 33% vinyl acetate having an intrinsic viscosity of 0.78 for 0.25 g in 100 ml toluene at 30°C.

EXAMPLES 61–70

Insecticidal compositions comprising DDVP as phosphoric ester, at least one benzodioxole as principal stabiliser therefor, a paraffin as solid adjuvant, a fossil silica as mineral adjuvant, and, in some cases, a complementary stabiliser chosen from sulphur, sulphur compounds, oxiranes and azoic compounds, an ethylene/vinyl acetate copolymer as an agent improving the mechanical properties of the paraffin, a pigment and/or a modified montmorillonite as dispersant allowing the composition to remain homogeneous before cooling.

TABLE VII

| DDVP | 61 | 62 | 63 | 64 | 65 | 66 | 67 | 68 | 69 | 70 |
|---|---|---|---|---|---|---|---|---|---|---|
|  | 24.25 | 24 | 24 | 25 | 25 | 24 | 24 | 25 | 25 | 20 |
| paraffin 60/62° | 64 | 65 | 65 | 57 | 57 | 57 | 56 | 52 | 51 | 68 |
| ethylene/vinyl acetate copolymer (71:29) | — | — | — | — | — | — | — | 12 | 12 | — |
| diatomaceous earth | — | — | — | 15 | 15 | 12 | 12 | 10 | 10 | 10 |
| amine oleate (e') | — | — | — | — | — | 5 | 5 | — | — | — |
| modified montmorillonite (e") | 9 | 9 | 9 | 1 | 1 | — | — | — | — | — |
| pigment (e) | 0.5 | 0.5 | 0.5 | — | 0.8 | — | 1 | — | 0.6 | 0.8 |
| cyclohexyl epoxystearate | — | — | — | — | 0.7 | — | — | — | — | — |
| azobenzene | — | — | — | — | — | 1 | — | — | — | — |
| diazene B | — | — | 0.4 | — | — | — | — | 0.5 | — | — |
| sulphur | — | — | — | 1 | — | — | — | — | — | — |
| sulphur compound B | — | 0.2 | — | — | — | — | — | — | 0.4 | — |
| sulphur compound F | — | — | 0.3 | — | — | — | — | — | — | — |
| benzodioxole A | 2.25 | — | — | 1 | — | — | — | 0.5 | — | 1.2 |
| benzodioxole B | — | 1.3 | — | — | — | 1 | — | — | — | — |
| benzodioxole E | — | — | 0.8 | — | 0.5 | — | 2 | — | 1 | — |

(e) yellow Irgalith BAW
(e') product formed by reaction, in a molecular ratio of 2:1 between oleic acid and a mixture of the following diamines:
  hexadecylaminopropylene amine (10%)
  octadecylamino propylene amine (50%)
  octadecylamine propylene amine (85%)
(e") mixture of dimethyl dihexadecylammonium montmorillonite (70%) and dimethyl dioctadecylammonium montmorillonite.

It is clear that the invention is not limited to the formulations just set forth, which are merely given as examples of the manifold possibilities of use of the invention. In particular, the DDVP of these formulations can be replaced by a phosphoric ester chosen from:

1. 2,2-dichloro vinyl dimethyl phosphate
2. 2,2-dichloro vinyl diethyl phosphate
3. 2,2-dichloro vinyl dipropyl phosphate
4. 2,2-dichloro vinyl dibutyl phosphate
5. 2,2,-dibromo vinyl dimethyl phosphate
6. 2,2-dibromo vinyl diethyl phosphate
7. 2,2-dibromo vinyl dipropyl phosphate
8. 2-bromo-2-chloro vinyl dimethyl phosphate
9. 2-bromo-2-chloro vinyl diethyl phosphate
10. 2,2-dichloro vinyl, ethyl methyl phosphate
11. 1,2-dibromo-2,2-dichloro ethyl dimethyl phosphate
12. 1,2-dibromo-2,2-dichloro ethyl diethyl phosphate
13. 1-bromo-2,2,2-trichloro ethyl dimethyl phosphate
14. 1-bromo-2,2,2-trichloro ethyl diethyl phosphate
15. 1,2,2,2-tetrabromo ethyl dimethyl phosphate
16. 1,2,2,2-tetrabromo ethyl diethyl phosphate
17. 1,2-dibromo-2,2-dichloro propyl dimethyl phosphate
18. 1,2-dibromo-2,2-dichloro propyl diethyl phosphate
19. 2,2-dichloro 1-methyl vinyl dimethyl phosphate
20. 2,2-dichloro 1-methyl vinyl diethyl phosphate and the corresponding thiophosphates, for example
21. 2,2-dichloro vinyl dimethyl thiophosphate.

What is claimed is:

1. A pesticidal composition consisting essentially of:

A. at least one phosphoric ester insecticide, the molecule of which has at least one alkyl group of one to three carbon atoms attached to the phosphoric anion wherein on contact with molecules of water, at least partial decomposition of the ester takes place by protonization replacement of said lower alkyl group by hydrogen, and B. a 1,3-benzodioxole insecticide synergist as a principal agent for stabilizing the said ester against decomposition by protonization and used in an effective stabilizing amount of from at least about 0.2 to not more than about 10% based on the weight of the phosphoric ester, said benzodioxole having no action as a toxicity synergist for the insecticide phosphoric acid ester in said proportions, said benzodioxole being selected from the group consisting of:

5(2-octylsulphinylpropyl) benzodioxole
5-propyl-6-(2,5,8-trioxadodecyl) benzodioxole
5-allyl benzodioxole
5-formyl benzodioxole
5-(3,6,9-trioxa undecyl-2-oxy) benzodioxole
5,6-bis(propyoxycarbonyl)-7-methyl-5,6,7,8-tetrahydro naphtho(2,3,-d)-1,3-dioxole
2,6-bis(5-benzodioxole-1,3-yl)-3,7-dioxabicyclo(3,3,0) octane 2-(5-benzodioxole-1,3,yl)-6-(5-benzodioxole-1,3-yl-oxy)-3,7-dioxabicyclo(3,3,0) octane
5-hydroxy benzodioxole
5-hydroxymethyl benzodioxole
5-(propen-1-yl) benzodioxole
5-acetonyl benzodioxole
5-(3-oxo-buten-1-yl) benzodioxole
5-cyanomethyl benzodioxole
5-(2-amino propyl) benzodioxole
5-(5-methyl 4-dioxane-1,3-yl) benzodioxole
5-benzoylmethyl benzodioxole
benzodioxole 5-bromo benzodioxole
5-nitrobenzodioxole
5-cyanobenzodioxole
5(2-N-phenylcarbamyl ethyl) benzodioxole
5[2-(4-methylbenzoyl)vinyl]benzodioxole
5-propyl benzodioxole
5(2-nitrovinyl) benzodioxole
N-piperonylidene (4-methyl aniline)
N-piperonylidene (5-chloro-2,4-dimethoxy aniline)

5-methoxy benzodioxole
sodium 7-methyl-5,6,7,8-tetrahydronaphtho[2,3-d]1,3 dioxole 5,6-dicarboxylate
zine 3(5-benzodioxole) acrylate
piperidine 3-(5-benzodioxole) acrylate
lead 3-(5-benzodioxole) acrylate
piperidine 5-benzodioxole carboxylate
2-benzoyl 3-(2-pyrrolidinoethoxy)(1,3-dioxolo)[4,5-f]indole 1-(4-methyl-2-nitrophenyl azo)-3-ethoxycarbonyl-4,4-dimethyl-1,2,6-dioxo cyclohexane
5-allyl benzodioxole
5-(3-oxo-butene-1-yl) benzodioxole 2. A composition according to claim 1 wherein the phosphoric ester insecticide is 2,2-dichlorodivinyl dimethyl phosphate and the benzodioxole is 5-allyl benzodioxole.

3. A composition according to claim 1 characterised in that the proportion of the stabilising agent is 0.5 to 6% of the weight of the phosphoric ester.

4. A composition according to claim 1 characterised in that the molecule of the phosphoric ester contains one of two groups chosen from ethyl and methyl groups.

5. A composition according to claim 1 characterised in that the phosphoric ester contains at least one methyl group.

6. A composition according to claim 1 characterised in that the phosphoric ester is chosen from:
2,2-dichloro vinyl dimethyl phosphate
2,2-dichloro vinyl diethyl phosphate
2,2-dichloro vinyl dipropyl phosphate
2,2-dibromo vinyl dimethyl phosphate
2,2-dibromo vinyl diethyl phosphate
2,2-dibromo vinyl dipropyl phosphate
2-bromo-2-chloro vinyl dimethyl phosphate
2-bromo-2-chloro vinyl diethyl phosphate
2,2-dichloro vinyl, ethyl methyl phosphate
1,2-dibromo-2,2-dichloro ethyl dimethyl phosphate
1,2-dibromo-2,2-dichloro ethyl diethyl phosphate
1-bromo-2,2,2-trichloro ethyl dimethyl phosphate
1-bromo-2,2,2-trichloro ethyl diethyl phosphate
1,2,2,2-tetrabromo ethyl diethyl phosphate
1,2-dibromo-2,2-dichloro propyl dimethyl phosphate
1,2-dibromo-2,2-dichloro propyl diethyl phosphate
2,2-dichloro 1-methyl vinyl dimethyl phosphate
2,2-dichloro 1-methyl vinyl diethyl phosphate.

* * * * *